US011979729B2

(12) United States Patent
Yang et al.

(10) Patent No.: US 11,979,729 B2
(45) Date of Patent: May 7, 2024

(54) SOUND-PRODUCING DEVICE

(71) Applicant: Goertek Inc., Shandong (CN)

(72) Inventors: Jianbin Yang, Weifang (CN); Shousong Qiang, Weifang (CN); Chunfa Liu, Weifang (CN)

(73) Assignee: Goertek Inc., Shandong (CN)

( * ) Notice: Subject to any disclaimer, the term of this patent is extended or adjusted under 35 U.S.C. 154(b) by 188 days.

(21) Appl. No.: 17/774,550

(22) PCT Filed: Nov. 5, 2020

(86) PCT No.: PCT/CN2020/126833
§ 371 (c)(1),
(2) Date: May 5, 2022

(87) PCT Pub. No.: WO2021/088937
PCT Pub. Date: May 14, 2021

(65) Prior Publication Data

US 2022/0377464 A1 Nov. 24, 2022

(30) Foreign Application Priority Data

Nov. 8, 2019 (CN) ......................... 201911089679.5

(51) Int. Cl.
*H04R 25/00* (2006.01)
*H04R 9/02* (2006.01)
*H04R 9/04* (2006.01)
*H04R 9/06* (2006.01)
*H04R 31/00* (2006.01)

(52) U.S. Cl.
CPC ............. *H04R 9/041* (2013.01); *H04R 9/025* (2013.01); *H04R 9/06* (2013.01); *H04R 31/006* (2013.01)

(58) Field of Classification Search
CPC ...... H04R 2400/11; H04R 9/043; H04R 9/06; H04R 9/02; H04R 9/04
USPC .......................................................... 381/400
See application file for complete search history.

(56) References Cited

U.S. PATENT DOCUMENTS

| | | | | |
|---|---|---|---|---|
| 5,757,945 | A * | 5/1998 | Sakamoto | H04R 9/06 381/400 |
| 7,515,727 | B2 * | 4/2009 | Watanabe | H04R 31/006 381/409 |
| 9,942,680 | B1 * | 4/2018 | Little | H04R 31/006 |
| 10,863,257 | B1 * | 12/2020 | Pierce | H04R 1/06 |
| 2005/0111689 | A1 * | 5/2005 | True | H04R 31/006 381/423 |
| 2017/0339478 | A1 | 11/2017 | Xiao et al. | |

(Continued)

*Primary Examiner* — Phylesha Dabney
(74) *Attorney, Agent, or Firm* — Baker Botts, LLP

(57) ABSTRACT

Disclosed is a sound-producing device including a voice coil, comprising a bobbin and a voice coil body wound outside the bobbin; and a damper having a first connecting part and a second connecting part; wherein the first connecting part is fixedly connected to the voice coil, and the second connecting part is fixed on the sound-producing device; there is provided a planar elastic member between the first connecting part and the second connecting part, the planar elastic member is bent and extends from the first connecting part to the second connecting part; the damper is made of conductive material, and is configured to establish electrical communication with the voice coil; the sound-producing device has a height in a vibration direction thereof ranging from 5 mm to 200 mm.

13 Claims, 3 Drawing Sheets

(56) References Cited

U.S. PATENT DOCUMENTS

| | | | | |
|---|---|---|---|---|
| 2019/0149924 | A1* | 5/2019 | Cheng | H04R 9/025<br>381/412 |
| 2022/0377465 | A1* | 11/2022 | Yang | H04R 9/046 |
| 2022/0408192 | A1* | 12/2022 | Yang | H04R 9/043 |
| 2022/0417664 | A1* | 12/2022 | Hsu | H05K 1/0277 |
| 2023/0199393 | A1* | 6/2023 | Chen | H04R 9/045<br>381/430 |
| 2023/0232157 | A1* | 7/2023 | Liu | H04R 9/043<br>381/400 |

* cited by examiner b: A Sound-producing Device Installed with a Prior Art Damper: Resonant Frequency F0 =195Hz c: A Sound-producing Device Installed with the Damper of the Present Disclosure: Resonant Frequency F0=170Hz b: A Sound-producing Device Installed with a Prior Art Damper
c: A Sound-producing Device Installed with the Damper of the Present Disclosure

SOUND-PRODUCING DEVICE

CROSS-REFERENCE TO RELATED APPLICATIONS

This application is a National Stage of International Application No. PCT/CN2020/126833, filed on Nov. 5, 2020, which claims priority to Chinese Patent Application No. 201911089679.5, filed on Nov. 8, 2019, both of which are hereby incorporated by reference in their entireties.

TECHNICAL FIELD

The present disclosure relates to the technical field of electro-acoustic conversion, and particularly to a sound-producing device.

BACKGROUND

A damper is one of the basic components of a sound-producing device, and is mainly used to ensure the correct position of a voice coil in a magnetic gap, to keep the vibration system reciprocating only in the axial direction when the voice coil is under force, to provide the elastic force for the vibration system to reciprocate, and to cooperate with the vibrating diaphragm and the voice coil of the vibration system to determine resonance frequency of the sound-producing device.

At present, there is usually provided a damper fixed on a bobbin of the voice coil in a traditional sound-producing device such as in a loudspeaker device, and the damper is of a corrugated shape. The structure of the traditional damper increases the height of the speaker along its vibration direction. In addition, a traditional sound-producing device needs to be provided an additional lead wire to implement electrical connection between the voice coil and the external circuit, causing interior space of the sound-producing device to be occupied by the lead wire during its routing.

Accordingly, in order to solve any of the above-mentioned technical problems, the present disclosure provides a novel sound-producing device.

SUMMARY

An object of the present disclosure is to provide a sound-producing device.

According to one aspect of the present disclosure, a sound-producing device is provided, including:

a voice coil, including a bobbin and a voice coil body wound outside the bobbin; and a damper having a first connecting part and a second connecting part; wherein the first connecting part is fixedly connected to the voice coil, and the second connecting part is fixed on the sound-producing device;

there is provided a planar elastic member between the first connecting part and the second connecting part, the planar elastic member is bent and extends from the first connecting part to the second connecting part;

the damper is made of conductive material, and is configured to establish electrical communication with the voice coil;

the sound-producing device has a height in a vibration direction thereof ranging from 5 mm to 200 mm.

Optionally, the sound-producing device further includes a casing on which the second connecting part is fixed;

a conductive terminal is bonded to the casing by injection molding, the conductive terminal being configured to connect to an external circuit and electrically connect to the second connecting part.

Optionally, the damper is a line-like structure formed by integrally winding a metal wire.

Optionally, the metal wire is any one of copper wire, iron wire, steel wire and alloy wire.

Optionally, the first connecting part is connected to a side surface of the voice coil body close to an end face thereof, so that the damper establishes electrical communication with the voice coil;

or the first connecting part is connected to a side surface of the bobbin, so that the damper establishes electrical communication with the voice coil.

Optionally, at least one damper is fixed on the bobbin; a first connecting part of a damper is fixed to a first connecting part of a damper adjacent thereto via a connection bridge;

wherein a second pad is provided at a position on the side surface of the bobbin corresponding to the connection bridge;

the connection bridge is connected to the second pad to establish electrical communication between the damper and the voice coil.

Optionally, an inner conduction structure is provided on the side surface of the voice coil body close to the end face thereof, and the first connecting part is fixedly connected to the inner conduction structure.

Optionally, the sound-producing device further comprises a basin-shaped U-iron where a magnet is provided in a basin thereof, the voice coil being provided inside the basin of the U-iron and being under action of magnetic field of the magnet;

the U-iron is provided with a notch, and the damper is connected to the voice coil through the notch.

Optionally, the damper is a planar structure as a whole.

Optionally, the planar elastic member spreads outward along a direction from the first connecting part to the second connecting part, and forms a spreading angle which is no less than 10°.

Optionally, the sound-producing device has a resonance frequency F0 of 50 Hz to 300 Hz.

Optionally, the sound-producing device has a height of 17 mm to 19 mm in a vibration direction thereof.

Optionally, the sound-producing device is a round sound-producing device or a square sound-producing device.

Advantages of the technical solution of the present disclosure are: the present disclosure provides a sound-producing device, where a damper is provided with a planar elastic member which is bent and extends from a first connecting part to a second connecting part. Compared with the prior art, the present disclosure reduces the height of the sound-producing device in its vibration direction, reduces the volume of the sound-producing device, and realizes light weight and miniaturization of the sound-producing device.

The present disclosure provides a sound-producing device, wherein on one hand, the damper can support and hold the voice coil in position; on the other hand, the damper is configured to establish electrical communication with the voice coil since the damper is made of conductive material. Compared with the prior art, the present disclosure reduces the use of lead wire and reduces the height of the sound-producing device in the vibration direction thereof.

Other features and advantages of the present disclosure will be readily apparent from the following detailed description of exemplary embodiments of the present disclosure with reference to the drawings.

BRIEF DESCRIPTION OF THE DRAWINGS

The accompanying drawings, which are incorporated into this specification and constitute a part thereof, illustrate embodiments of the present disclosure and, together with the description, serve to explain the principles of the present disclosure.

DETAILED DESCRIPTION

Figure 1:
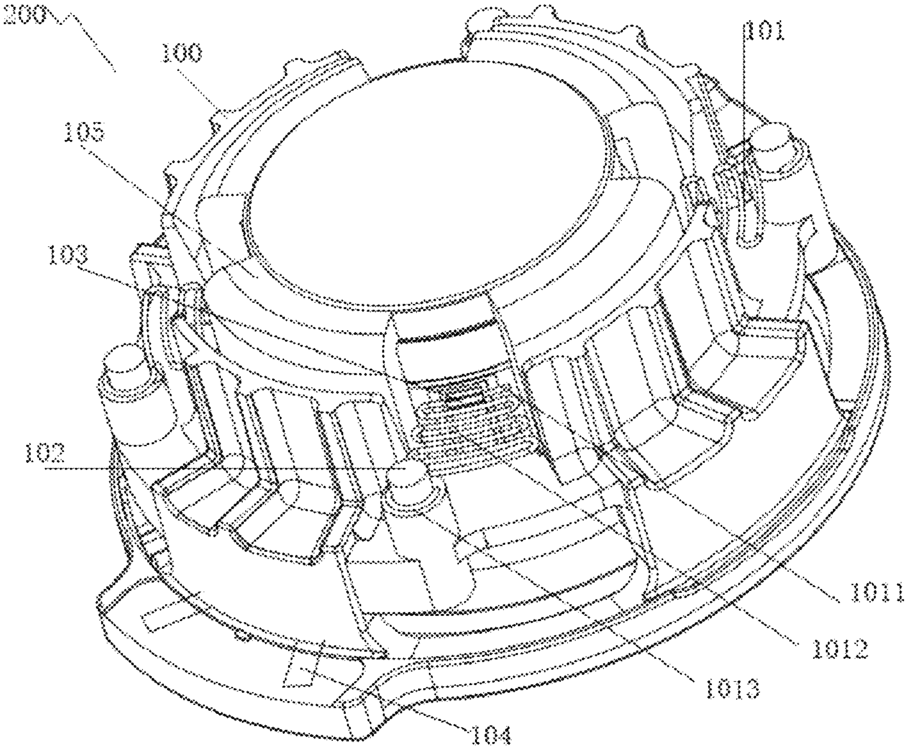
FIG. 1 is a schematic structural view of a sound-producing device of the present disclosure.

Various exemplary embodiments of the present disclosure will now be described in detail with reference to the accompanying drawings. It is to be noted that unless otherwise specified, relative arrangement, numerical expressions and numerical values of components and steps illustrated in these embodiments do not limit the scope of the present disclosure.

Description to at least one exemplary embodiment is in fact illustrative only, and is in no way limiting to the present disclosure or application or use thereof.

Techniques, methods and devices known to those skilled in the prior art may not be discussed in detail; however, the techniques, methods and devices shall be regarded as part of the description where appropriate.

In all the illustrated and discussed examples, any specific value shall be explained as only exemplary rather than restrictive. Thus, other examples of exemplary embodiments may have different values.

It is to be noted that similar reference numbers and alphabetical letters represent similar items in the drawings below, such that once a certain item is defined in a drawing, further discussion thereon in the subsequent drawings is no longer necessary.

According to an embodiment of the present disclosure, a sound-producing device is provided. The sound-producing device includes:

a voice coil, comprising a bobbin and a voice coil body wound outside the bobbin; and a damper having a first connecting part and a second connecting part; wherein the first connecting part is fixedly connected to the voice coil, and the second connecting part is fixed on the sound-producing device;

there is provided a planar elastic member between the first connecting part and the second connecting part, the planar elastic member is bent and extends from the first connecting part to the second connecting part;

the damper is made of conductive material, and is configured to establish electrical communication with the voice coil;

the sound-producing device has a height in a vibration direction thereof ranging from 5 mm to 200 mm.

The present disclosure provides a sound-producing device, where a damper is provided with a planar elastic member which is bent and extends from a first connecting part to a second connecting part. Compared with the prior art, the present disclosure reduces the height of the sound-producing device in its vibration direction, reduces the volume of the sound-producing device, and realizes light weight and miniaturization of the sound-producing device.

The present disclosure provides a sound-producing device, wherein on one hand, the damper can support and hold the voice coil in position; on the other hand, the damper is configured to establish electrical communication with the voice coil by means of an inner conduction structure and an outer conduction structure. Compared with the prior art, the present disclosure reduces the use of lead wire and reduces the height of the sound-producing device in the vibration direction thereof.

In one example, FIG. 1 is a schematic structural diagram of a sound-producing device of the present disclosure.

The sound-producing device includes a voice coil. The voice coil includes a voice coil body and a bobbin. The bobbin is in the shape of a circular tube, and the voice coil body is wound outside the bobbin. A bottom end of the voice coil is suspended in the magnetic gap of the magnetic circuit system.

The sound-producing device includes a damper 101. The damper 101 has a first connecting part 1011 fixed to the voice coil, a second connecting part 1013 fixed to the sound-producing device, and a planar elastic member 1012 between the first connecting part 1011 and the second connecting part 1013. Here, as shown in FIG. 1, the planar elastic member 1012 is bent and extends in an S shape from the first connecting part 1011 to the second connecting part 1013, and the planar elastic member exhibits a planar structure. Compared with the corrugated dampers in the prior art, the special structural design of the damper in this example can reduce the height of the sound-producing device in its vibration direction.

Preferably, the sound-producing device further includes a casing 100 on which the second connecting part 1013 is fixed. For example, the casing 100 is provided thereon with a fixing pillar 102, and the second connecting part 1013 is sleeved on the fixing pillar 102. For example, the second connecting part 1013 is in a hooked shape, and the second connecting part 1013 is sleeved on the fixing pillar 102.

In one example, there is a planar elastic member 1012 between the first connecting part 1011 and the second connecting part 1013, and the planar elastic member 1012 is bent and extends from the first connecting part 1011 to the second connecting part 1013. The damper 101 is made of conductive material, and is configured to establish electrical communication with the voice coil.

For example, a conductive terminal is bonded to the casing 100 by injection-molding. The conductive terminal is configured to connect to an external circuit, and the second connecting part 1013 is electrically connected to the conductive terminal. Since the damper 101 is made of conductive material, and the first connecting part 1011 is fixed on the voice coil, the damper 101 in this example realizes the electrical communication between the voice coil and an external circuit. Compared with the traditional sound-producing device which requires an additional lead wire to realize the electrical connection between a voice coil and an external circuit, this example does not require a lead wire, thereby saving the interior space of the sound-producing device which would otherwise be occupied by the lead wire in the process of routing, i.e., saving the height of the sound-producing device in its vibration direction.

For example, the first connecting part 1011 is fixed on the voice coil by the inner conduction structure 103, wherein the inner conduction structure 103 is welded to an enameled wire of the voice coil body, thereby realizing the electrical connection between the first connecting part and the voice coil.

An outer conduction structure 104 is provided at a position close to the casing. The second connecting part 1013 is connected to the outer conduction structure, wherein the outer conduction structure is configured to be connected to an external circuit, thereby realizing the electrical connection between the second connecting part 1013 and the external circuit.

The damper 101 realizes electrical communication between the voice coil and the external circuit through the inner conduction structure 103 and the outer conduction structure 104. Compared with the prior art, the present disclosure reduces the use of lead wire, and reduces the height of the sound-producing device in its vibration direction.

In one example, the first connecting part 1011 is connected to a side surface of the voice coil body close to an end face thereof, so that the damper 101 is in electrical communication with the voice coil.

Alternatively, the first connecting part 1011 is connected to a side surface of the bobbin, so that the damper 101 is in electrical communication with the voice coil.

When the first connecting part 1011 is connected to a side surface of the voice coil body close to its end face, the first connecting part 1011 of the damper 101 is connected to a side surface of the voice coil body close to its bottom end face; and the second connecting part 1013 is connected to the casing 100. For example, the first connecting part 1011 is fixed on the side surface of the voice coil body close to the bottom end face of the voice coil body via the inner conduction structure 103, wherein the inner conduction structure 103 is welded to the enameled wire of the voice coil body, thereby realizing the electrical connection between the first connecting part and the voice coil body.

The casing 100 is provided with a fixing pillar 102, and the second connecting part 1013 is sleeved on the fixing pillar 102. For example, the second connecting part 1013 is in a hooked shape, and is sleeved on the fixing pillar 102. Here, the second connecting part 1013 can be provided with one turn of hook structure to ensure the flatness of the product (at this time, the entire conductive member is a planar structure), or there may be provided a plurality turns of hooked structures whose orthographic projections in the vertical direction overlap.

The outer conduction structure 104 is provided at a position close to the fixing pillar 102 of the casing. The second connecting part 1013 is connected to the outer conduction structure, wherein the outer conduction structure is configured to be connected to an external circuit, thereby realizing electrical connection between the second connecting parts 1013 and the external circuit.

Figure 3:
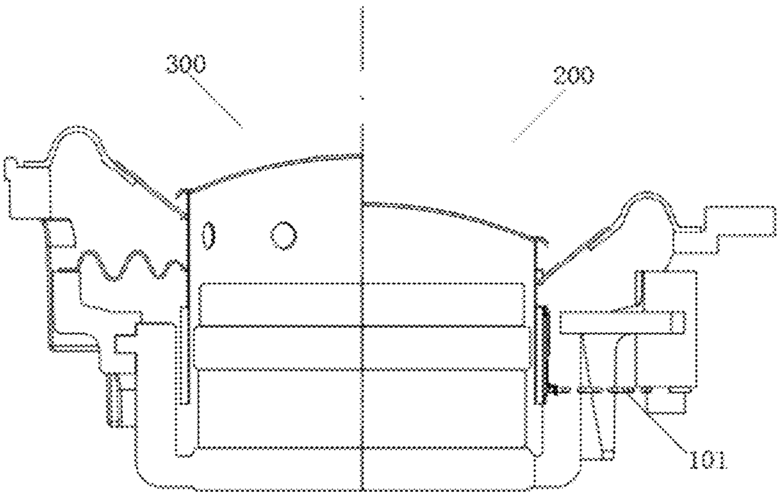
FIG. 3 is a comparison view showing a height of the sound-producing device of the present disclosure and the height of an existing sound-producing device.

In this example, the first connecting part **101*l* is connected to the side surface of the voice coil body close to the end face thereof, so that the damper 101 is in electrical communication with the voice coil. FIG. 3 shows a comparison view between the height of a prior art sound-producing device 300 and the height of the sound-producing device 200 of the present disclosure. As shown in FIG. 3, the damper 101 is provided at a root region of the voice coil body. After electrical connection with the inner conduction structure, the first connecting part of the damper extends out through the avoidance part of the magnetic circuit system to the casing, and electrically connects to the outer conduction structure, thereby realizing electrical connection between the voice coil and the external circuit by means of the damper. As such, the height of the sound-producing device 200 of the present disclosure in its vibration direction is obviously lower than that of the prior art sound-producing device 300. The height of the sound-producing device 200 of the present disclosure in its vibration direction is in the range of 5 mm to 200 mm, and preferably the height of the sound-producing device 200** in the vibration direction is 17 mm to 19 mm. This example enables lightness and miniaturization of the sound-producing device.

It should be noted that the 5 mm to 200 mm range here fully takes into account of the current demand for sound-producing devices in consumer electronic terminals and automotive electronic terminals. Regarding this technical solution, it can be applied to car audio products, and can also be used in consumer audio products (such as home audio, other smart audio products, etc.).

When the first connecting part 1011 is connected to the side surface of the bobbin, the first connecting part 1011 of the damper 101 is connected to the side surface of the bobbin; and the second connecting part 1013 is connected to the casing 100. For example, the first connecting part 1011 is fixed on the side surface of the bobbin by the pad, wherein the pad is welded to the enameled wire of the voice coil body, thereby realizing the electrical connection between the first connecting part and the voice coil body.

When the first connecting part 1011 is connected to the side surface of the bobbin, at least one of the dampers is fixed on the bobbin. A first connecting part of a damper is fixed to a first connecting part of a damper adjacent thereto via a connection bridge. For example, four dampers are fixed on the side surface of the bobbin, where a damper is connected to a damper adjacent thereto via a connection bridge, and first connecting parts of the other two dampers are also connected via connection bridges.

Here, the connection bridge has a convex structure, and the convex structure is attached to the side surface of the voice coil. Specifically, the convex structure is attached to the side surface of the bobbin.

Optionally, the connection bridge may also be of an arc-shaped structure, and the arc-shaped structure is attached to the side surface of the bobbin.

Preferably, a damper is integrally formed with its adjacent damper and the connection bridge.

Preferably, the pad include a first pad and a second pad, wherein the first pad is used for fixing the first connecting part, and the first connecting part is connected to the first pad so as to establish electrical communication between the damper and the voice coil; the second pad is used for fixing the connection bridge, and the connection bridge is connected to the second pad so as to establish electrical communication between the damper and the voice coil.

Preferably, the inner conduction structure 103 is a third pad fixed on the side surface of the voice coil body close to the bottom end surface thereof. In this example, the third pad has a bearing portion, and the bearing portion is configured to fix the first connecting part 1011, and the first connecting part 1011 is welded to the third pad. The bearing portion is in a bent structure. This example facilitates fixing of the first connecting part 1011 to the third pad.

Preferably, the outer conduction structure 104 is provided at a position close to the casing. The outer conduction structure 104 is a soldering piece inject-molded on the casing; wherein the soldering piece is exposed on the outer surface of the casing. This example facilitates the connection between the external circuit and the sound-producing device.

Figure 2:
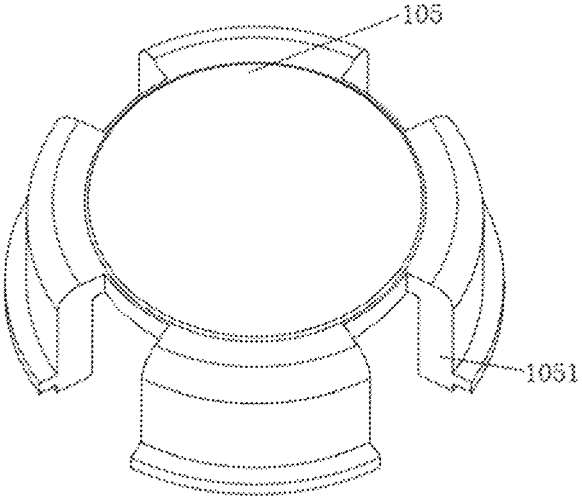
FIG. 2 is a schematic structural view of a U-iron of the present disclosure.

In one example, the magnetic circuit system is provided thereon with an avoidance part corresponding to the damper 101. Specifically, as shown in FIG. 2, the magnetic circuit system includes a basin-shaped U-iron where a magnet is provided in a basin thereof. In this example, the avoidance part is a notch 1051 provided on the U-iron.

In this example, when the first connecting part 101 is connected to the side surface of the voice coil body close to its end surface, the damper 101 is configured to be able to pass through the notch 1051 and be connected to a side surface of the voice coil body close to its bottom end surface. That is, the notch 1051 opened on the U-iron 105 forms an avoidance space, so that the damper 101 can generate vibration along the vibration direction of the sound-producing device.

Here, the notch opening angle is in the range of 20° to 40°. Preferably, the notch opening angle is in the range of 30°. Here, within this range of notch opening angle, the vibration space of the damper can be guaranteed, so as not to influence the vibration frequency of the sound-producing device and the acoustic performance thereof.

The damper is a two-piece separated structure symmetrically arranged on two sides of the voice coil body; alternatively, the damper is a three-piece or four-piece separated structure evenly distributed on the periphery of the voice coil body. Here, dampers are arranged in a symmetrical manner or in an array manner, which can play a good supportive role in holding the voice coil in position.

Preferably, the number of dampers provided on the voice coil body is the same as the number of correspondingly provided notches on the U-iron 105. In this example, the damper is a four-piece separated structure evenly distributed on the periphery of the voice coil body, and there are four notches correspondingly provided on the U-iron.

In an example, the damper 101 is formed by integrally winding a metal wire, wherein the metal wire can be any one of copper wire, iron wire, steel wire, and alloy wire. Through forming the damper by integrally winding a metal wire, the diaphragm in the sound-producing device can provide better compliance when vibrating under large displacement. At the same time, the damper is made of metal material, so that it is less influenced by high temperature and high humidity environment, and has excellent fatigue resistance, thereby enabling the sound-producing device to work in harsh environments.

In one example, the planar elastic member 1012 spreads outward along the direction from the first connecting part 101*l* to the second connecting part 1013, and the planar elastic member 1012 forms a spreading angle which is no less than 10°. The inventors have found that with the increase of the spread angle, the value of the mechanical stiffness of the damper decreases, and the linearity of the mechanical stiffness of the damper becomes better. For example, the mechanical stiffness of the damper ranges from 0.2 N/mm to 2 N/mm, and preferably, the mechanical stiffness of the damper is 0.56 N/mm. Within this range of mechanical stiffness, the performance of the damper is better, and at the same time, it plays a good supportive role in holding the voice coil in position.

The inventors have found that, by using the damper 101 of the present disclosure in a manner that the damper is fixed on the voice coil, the sound-producing device may have good compliance even if in vibration and displacement. At the same time, distortion of the sound producing device may be reduced, and acoustic performance of the sound-producing device may be improved.

Figure 4:
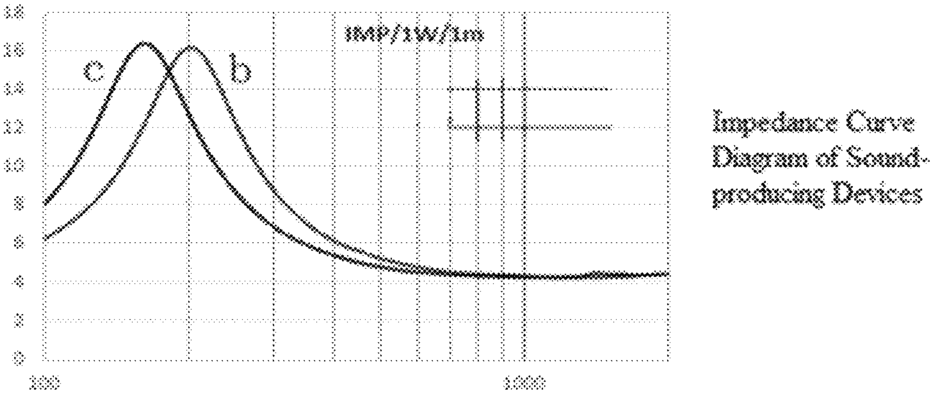
FIG. 4 is an impedance curve diagram of the sound-producing device of the present disclosure and a traditional sound-producing device.

Specifically, as shown in FIG. 4, the abscissa represents the resonance frequency F0, the curve b represents the resonance frequency F0 of the traditional sound-producing device; and the curve c represents the resonance frequency F0 of the sound-producing device according to the embodiment of the present disclosure.

Here, the resonance frequency F0 of the sound-producing device in the embodiment of the present disclosure is 50 Hz to 300 Hz, and preferably, the resonance frequency F0 is 170 Hz. Here, the resonance frequency F0 of the traditional sound-producing device is 195 Hz. Therefore, when the damper of the embodiment of the present disclosure is applied to a sound-producing device, the sound-producing device has excellent low-frequency response and mid-frequency response, and the acoustic performance of the sound-producing device is improved, wherein the sound-producing device can be a large bass sound-producing device or alto sound-producing device.

Figure 5:
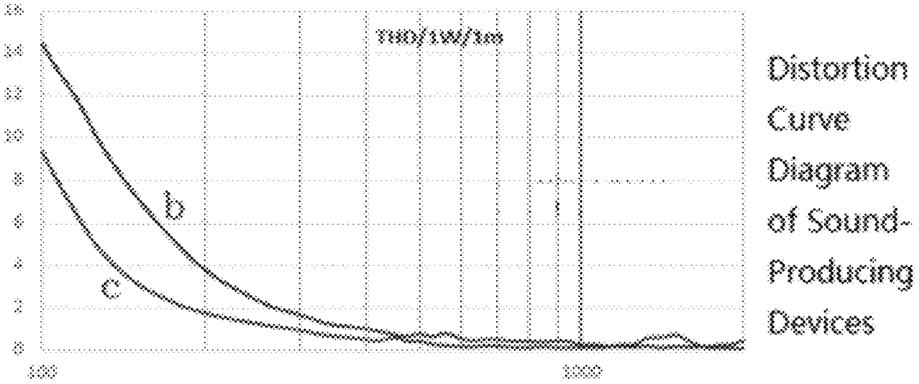
FIG. 5 is a distortion curve diagram of the sound-producing device of the present disclosure and a prior-art sound-producing device.

At the same time, applying the damper to the sound-producing device can reduce the total harmonic distortion THD of the sound-producing device and improve the acoustic performance thereof. Specifically, as shown in FIG. 5, the abscissa represents the vibration frequency, and the ordinate represents the total harmonic distortion THD; the curve b represents the total harmonic distortion THD of the sound-producing device using the traditional damper, and the curve c represents the total harmonic distortion THD of the sound-producing device using the damper of the present disclosure.

For example, in the frequency range of 100 Hz to 300 Hz, the total harmonic distortion THD of the sound-producing device of the present disclosure is less than 10%; specifically, when the frequency is 100 Hz, the total harmonic distortion THD of the sound-producing device is less than 10%; when the frequency is 200 Hz, the total harmonic distortion THD of the sound-producing device is less than 2.5%; when the frequency is 300 Hz, the total harmonic distortion THD of the sound-producing device is less than 2%.

By contrast, when a traditional damper is provided in the sound-producing device, the total harmonic distortion THD of the traditional sound-producing device is less than 16%; specifically, when the frequency is 100 Hz, the total harmonic distortion THD of the sound-producing device is less than 16%; when the frequency is 200 Hz, the total harmonic distortion THD of the sound-producing device is less than 5%; when the frequency is 300 Hz, the total harmonic distortion THD of the sound-producing device is less than 2.5%.

Therefore, the sound-producing device in this example has excellent acoustic performance.

It should be noted that although only a round sound-producing device is used as an example for illustration in this embodiment, in specific applications, this technical solution can also be applied to a square sound-producing device. Of course, it can also be applied to devices of other shapes. There are not intended to limit the present disclosure.

Although the present disclosure has been described in detail in connection with some specific embodiments by way of illustration, those skilled in the art should understand that the above examples are provided for illustration only and should not be taken as a limitation on the scope of the disclosure. Those skilled in the art will appreciate that modifications may be made to the above embodiments without departing from the scope and spirit of the present disclosure. We therefore claim as our invention all that comes within the scope of the appended claims.

The invention claimed is:

1. A sound-producing device, comprising:

a voice coil, comprising a bobbin and a voice coil body wound outside the bobbin;

a damper having a first connecting part and a second connecting part; wherein the first connecting part is fixedly connected to the voice coil, and the second connecting part is fixed on the sound-producing device; and a bent planar elastic member positioned between the first connecting part and the second connecting part, extending therebetween;

wherein the damper is made of conductive material, and is configured to establish electrical communication with the voice coil;

wherein the sound-producing device has a height in a vibration direction thereof ranging from 5 mm to 200 mm.

2. The sound-producing device of claim 1, further comprising a casing on which the second connecting part is fixed;

wherein a conductive terminal is bonded to the casing by injection molding, the conductive terminal being configured to connect to an external circuit and electrically connect to the second connecting part.

3. The sound-producing device of claim 1, wherein the damper is a line-like structure formed by integrally winding a metal wire.

4. The sound-producing device of claim 3, wherein the metal wire is selected from the group consisting of copper wire, iron wire, steel wire and alloy wire.

5. The sound-producing device of claim 1, wherein the first connecting part is connected to at least one of a side surface of the voice coil body proximate to an end face thereof and the bobbin, so that the damper establishes electrical communication with the voice coil.

6. The sound-producing device of claim 5, wherein at least one damper is fixed on the bobbin; a first connecting part of a damper is fixed to a first connecting part of a damper adjacent thereto via a connection bridge;

wherein a second pad is provided at a position on the side surface of the bobbin corresponding to the connection bridge;

the connection bridge is connected to the second pad to establish electrical communication between the damper and the voice coil.

7. The sound-producing device of claim 5, wherein an inner conduction structure is provided on the side surface of the voice coil body proximate to the end face thereof, and the first connecting part is fixedly connected to the inner conduction structure.

8. The sound-producing device of claim 7, wherein the sound-producing device further comprises a basin-shaped U-iron where a magnet is provided in a basin thereof, the voice coil being provided inside the basin of the U-iron and being under action of magnetic field of the magnet;

the U-iron is provided with a notch, and the damper is connected to the voice coil through the notch.

9. The sound-producing device of claim 1, wherein the damper comprises a planar structure.

10. The sound-producing device of claim 1, wherein the planar elastic member spreads outward along a direction from the first connecting part to the second connecting part, and forms a spreading angle which is no less than 10°.

11. The sound-producing device of claim 1, wherein the sound-producing device has a resonance frequency F0 of 50 Hz to 300 Hz.

12. The sound-producing device of claim 1, wherein the sound-producing device has a height of 17 mm to 19 mm in a vibration direction thereof.

13. The sound-producing device of claim 1, wherein the sound-producing device is selected from the group consisting of a round sound-producing device and a square sound-producing device.

* * * * *